(12) United States Patent
Singer et al.

(10) Patent No.: US 6,711,639 B1
(45) Date of Patent: Mar. 23, 2004

(54) SYSTEM AND METHOD FOR PROCESSOR BUS TERMINATION

(75) Inventors: James H. Singer, Round Rock, TX (US); Sandor Farkas, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 469 days.

(21) Appl. No.: 09/704,626

(22) Filed: Nov. 2, 2000

(51) Int. Cl.[7] .............................................. G06F 13/00
(52) U.S. Cl. ...................... 710/100; 301/302; 301/303; 301/304
(58) Field of Search ................................ 701/301–304, 701/100

(56) References Cited

U.S. PATENT DOCUMENTS

| | | | |
|---|---|---|---|
| 5,467,455 A | 11/1995 | Gay et al. ..................... | 395/281 |
| 5,473,264 A | 12/1995 | Mader et al. .................. | 326/30 |
| 5,706,447 A | 1/1998 | Vivio .......................... | 395/309 |
| 5,734,208 A | 3/1998 | Jones .......................... | 307/139 |
| 5,748,910 A | 5/1998 | Herrera E. .................... | 395/281 |
| 5,918,023 A | 6/1999 | Reeves et al. ................ | 395/282 |
| 6,058,444 A | 5/2000 | Johnson ....................... | 710/102 |
| 6,067,596 A * | 5/2000 | Nguyen et al. | |
| 6,092,134 A * | 7/2000 | Chun et al. .................. | 710/301 |
| 6,128,685 A | 10/2000 | Cronin ........................ | 710/126 |
| 6,249,142 B1 * | 6/2001 | Hall et al. ..................... | 326/30 |
| 6,249,832 B1 * | 6/2001 | Sanders et al. ............. | 710/301 |
| 6,282,596 B1 * | 8/2001 | Bealkowski et al. ........ | 710/302 |
| 6,300,789 B1 * | 10/2001 | Ball ............................. | 326/30 |
| 6,434,653 B1 * | 8/2002 | Winston ...................... | 710/303 |
| 2002/0009929 A1 * | 1/2002 | Miller et al. ................. | 439/637 |
| 2002/0080883 A1 * | 6/2002 | Tamura et al. .............. | 375/257 |

OTHER PUBLICATIONS

Intel, *P6 Family of Processors*, Hardware Developer's Manual, Sep. 1998, pp. 1–1—2–7.
Philips, *GTL2020/GTL2021/GTL2022/GTL2023*, Data Sheet, Jan. 14, 2000.

* cited by examiner

*Primary Examiner*—Khanh Dang
*Assistant Examiner*—Kim T. Huynh
(74) *Attorney, Agent, or Firm*—Baker Botts L.L.P.

(57) ABSTRACT

A method and system for terminating the processor bus of a computer system is provided in which an external termination resistor is coupled between the processor and power at the optional processor socket. The placement of an external resistor at this location permits the termination of the bus irrespective of whether the computer system is configured to operate as a single processor system or a dual processor system. The value of external resistor is set to establish an impedance matching condition along the length of the processor bus.

12 Claims, 2 Drawing Sheets

SYSTEM AND METHOD FOR PROCESSOR BUS TERMINATION

TECHNICAL FIELD OF THE INVENTION

The present disclosure relates generally to computer systems, and, more particularly, to a system and method for terminating the processor bus of multiprocessor computer systems.

BACKGROUND OF THE INVENTION

A computer system generally includes various system components that are coupled together using one or more interconnected buses. As an example, a computer system may include a processor that is coupled to a processor bus. Also coupled to the processor bus is a memory controller bridge, which couples the processor bus to system memory, and a PCI bridge, that couples the processor bus to the PCI bus of the computer system. In the case of multi-processor computer systems, two or more processors may be coupled to the processor bus.

As processors, memories, and other system components increase in speed, the buses of the computer system begin to behave like transmission lines. As transmission frequencies and edge rates increase, signal integrity problems on the buses of the computer system are exacerbated. Reflections, false signal edges, incorrect voltage levels on the bus can cause false triggering, contribute to the transfer of erroneous data, and contribute to signal jitter. With respect to the processor bus, these signal integrity problems are often worse in multiprocessor systems because of the number of devices that are coupled to the bus.

In an attempt to solve the signal integrity problems, recent bus designs have placed strict controls on many of the electrical and mechanical parameters of the bus. In the case of high frequency bus communications, bus termination is necessary. Termination is often a requirement of bus standards to insure impedance matching across all of the loads of the bus. A processor bus standard that requires bus termination is the Gunning Transceiver Logic (GTL) standard and its successors, Gunning Transceiver Logic Plus (GTL+) and Assisted Gunning Transceiver Logic Plus (AGTL+). The communications frequency of a processor bus operating according to the AGTL+ standard can reach higher than 100 MHz. In this environment, if the processor bus is not terminated there may be an impedance mismatch between the processor bus itself and the processor or load. If there is an impedance mismatch some of the energy of the signal will be reflected back to the transmission line from the load. The effects of the reflection can be seen on the bus until the reflection is dissipated by the impedance of the loads of the processor bus or the processor bus itself.

The AGTL+ processor bus standard and its predecessors are designed to accommodate lower voltage swings. The AGTL+ bus standard includes open drain buffers at the ends of the bus that require pull-up resistors to terminate the bus. It is preferred in the AGTL+ bus standard that a processor reside on each end of the bus. Each processor package, which includes the CPU unit and may include other components, such as an L2 cache, includes the termination resistor for the bus. In this scenario in the case of a dual processor system, a processor package is installed in each of the two processor sockets on the printed circuit board. A difficulty arises, however, when the computer system is configured to include only a single processor. In this case, only the end of the bus that is coupled to the processor is terminated. Because the other end of the bus is coupled only to an empty processor socket, this end of the bus is not terminated.

A variety of techniques have been developed to provide for termination of the processor bus in single processor systems that include printed circuit boards that include two processor sockets. One technique is to couple a termination card to the empty processor socket. Termination cards are often costly and provide little functionality other than termination of the processor bus. The use of a termination card in an empty processor socket adds at least one more step to the manufacturing process, which necessarily introduces the possibility of error in the manufacture of a computer system. If a termination card is not installed in the empty processor socket in a single processor computer system, the computer system will likely not pass its system test and will have to be passed through an extra manufacturing or repair process. As such, the use of a termination card in an empty processor socket requires that the computer system manufacturer determine that a termination card must be installed and then correctly install the termination card.

As an alternative to the use of a termination card, some computer systems include a termination device that is coupled to the printed circuit board. An example of such a device is the GTL2020 terminator device manufactured by Philips Semiconductors of Sunnyvale, Calif. A terminator device is coupled to the end points of the processor bus and switches a termination resistor in and out of contact with the processor bus depending upon whether a processor is located in the second and potentially vacant processor socket. If a processor is installed in the second processor socket, the termination device switches a termination resistor out of contact with the processor bus, and the processor bus is terminated by a termination resistor in the package of the second processor. If a processor is not installed in the second processor socket, a termination resistor in the termination device is placed in contact with the processor bus, thereby terminating the processor bus. The use of a termination device, however, introduces a set of complications. Because a termination device is placed on the printed circuit board, the termination device will consume valuable space on an already crowded printed circuit board. Further, any distance between the second processor socket and the termination device will introduce capacitive effects on the transmission lines of the processor bus, thereby degrading the signal integrity of the processor bus. In many cases, it is difficult to place the termination device at a short distance from the second processor socket because of spacing requirements from the processor on the printed circuit board. Moreover, termination devices may be expensive and add another step to the process of manufacturing a computer system.

SUMMARY OF THE INVENTION

In accordance with the present disclosure, disclosed system and method for terminating the processor bus of a computer system provides significant advantages over current processor bus termination techniques. The processor bus of the present disclosure is terminated at one end by a primary processor and at a second end by an external termination resistor coupled between the processor bus and +V power at the connection of the processor bus and processor socket on the printed circuit board that receives a second processor in a dual processor system. Because the second processor includes an onboard termination resistor, the cumulative value of the termination resistance at the processor bus adjacent to the optional processor socket in a dual processor configuration is the parallel combination of the external termination resistor and the onboard termination resistor. In a single processor configuration, the value of the termination resistance at the processor bus adjacent to the optional processor socket is the value of the external termination resistor. The values of the external termination resistor and onboard termination resistor of the second processor are selected such that the end of the processor bus adjacent the optional processor socket is terminated irrespective of whether the computer system is configured as a single processor system or a dual processor system.

The bus processor termination technique disclosed herein is advantageous because it permits single processor computer systems to be manufactured with a dual processor printed circuit board without the installation of expensive termination cards or termination devices. Aside from being costly, termination devices consume valuable space on the printed circuit board of the computer system, and introduce capacitive effects on the processor bus. Termination cards are also costly and extra steps to the manufacturing process. Another advantage of the computer system is that the use of a single termination resistor at the location of the optional processor socket is an inexpensive means of terminating the processor bus. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The present disclosure concerns a method and system for terminating the processor bus of a computer system that includes a processor bus that must be terminated at its endpoints and that can be configured to accommodate one or more processors. The method and system described permits the termination of a processor bus in a manner that is transparent to the computer system manufacturer and that does not rely upon expensive termination cards, manufacturer intervention, or termination devices.

Figure 1:
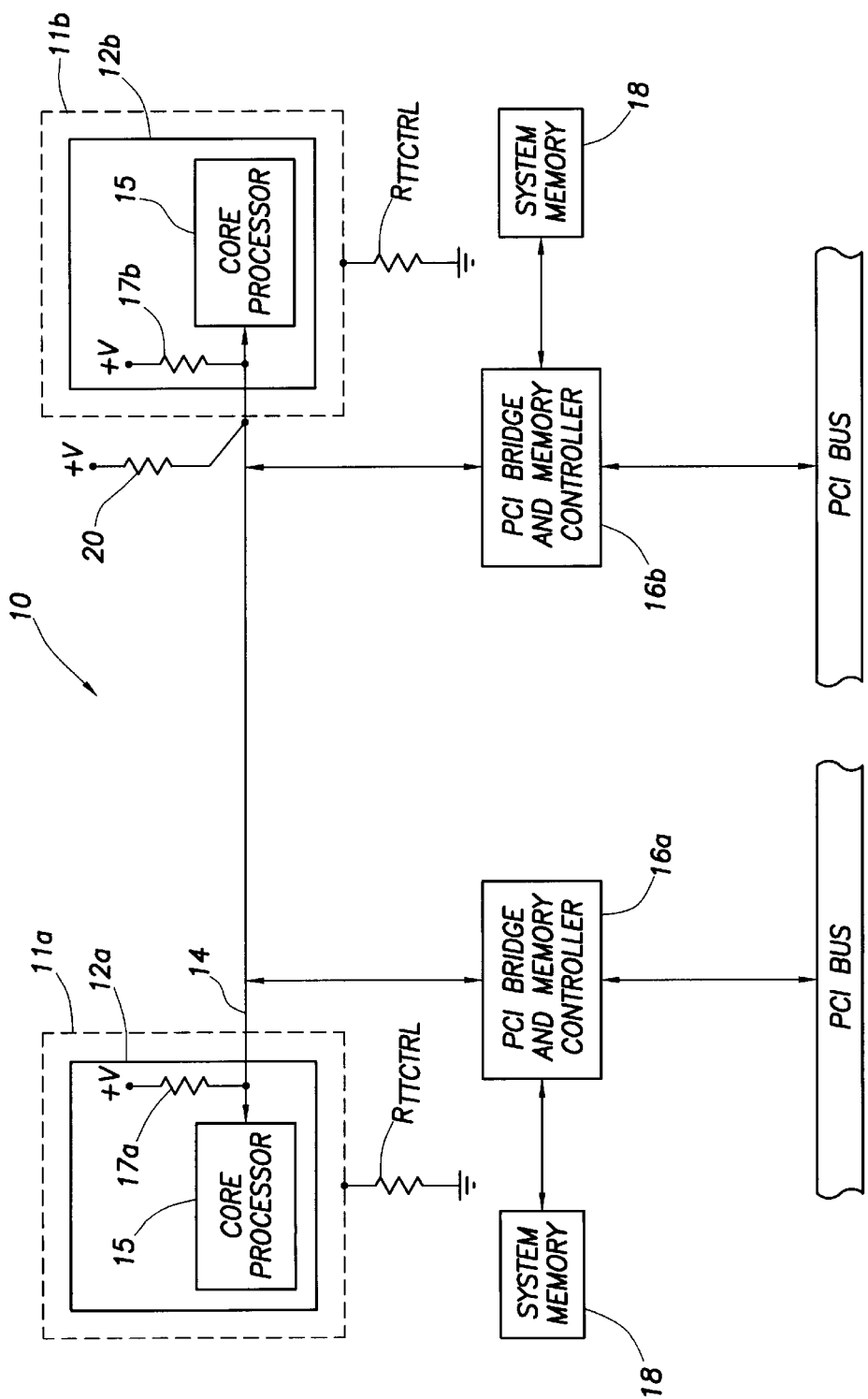
FIG. 1 is a schematic block diagram of a dual processor computer system.

Shown in FIG. 1 is a schematic block diagram of a computer system, which is indicated generally at 10. Computer system 10 includes processor sockets or connectors 11a and 11b (shown as a dashed line) for receiving, respectively, processors 12a and 12b. Each of the processors includes a core processor 15 and termination resistors 17a and 17b, respectively. Each of termination resistors 17a and 17b is coupled to a voltage (shown in the drawings as a voltage +V) that causes each of termination resistors 17a and 17b to behave as pull-up resistors. Processors 12a and 12b may also include an L2 cache or other components that are integrated into the processor package, along with the core processor and termination resistor. A processor bus 14 is coupled between processors 12a and 12b and is terminated at each end by the processors, including termination resistors 17a and 17b. Coupled to processor bus 14 are memory controller and PCI bridges 16a and 16b, each of which is coupled to system memory 18. Each of the PCI bridges 16a and 16b is coupled to a PCI bus. Although not shown, one more PCI devices, including an expansion bus bridge, may be coupled to PCI bus. The computer system architecture shown in FIG. 1 is illustrative only and is not necessary for the operation of the present invention. The example architecture of FIG. 1 is included as an example of a computer architecture that can take advantage of the processor bus termination technique disclosed herein.

Included in FIG. 1 is a termination resistor 20, which is coupled at processor 12b between the endpoint of processor bus 14 and +V power. Termination resistor 20 is coupled between processor 12b and a voltage (shown in the drawings as a voltage +V). Because termination resistor 17b of processor 12b and termination resistor 20 are connected in parallel, the resulting impedance that is seen at the endpoint of processor bus 14 is equal to the parallel resistance value of the termination resistor 17b of processor 12b and termination resistor 20. In many processor systems, such as the Intel Pentium III family of microprocessors, it is possible to control the value of the interior termination resistor 17b by coupling a resistor $R_{TTCTRL}$ between the processor socket 11a and 11b and ground. So long as the value of the resistor $R_{TTCTRL}$ is between a defined range of resistances, 30 ohms–140 ohms for example, the processor will set its internal termination resistor 17b to have a resistance value equal to the resistance value of the external control resistor $R_{TTCTRL}$.

Figure 2:
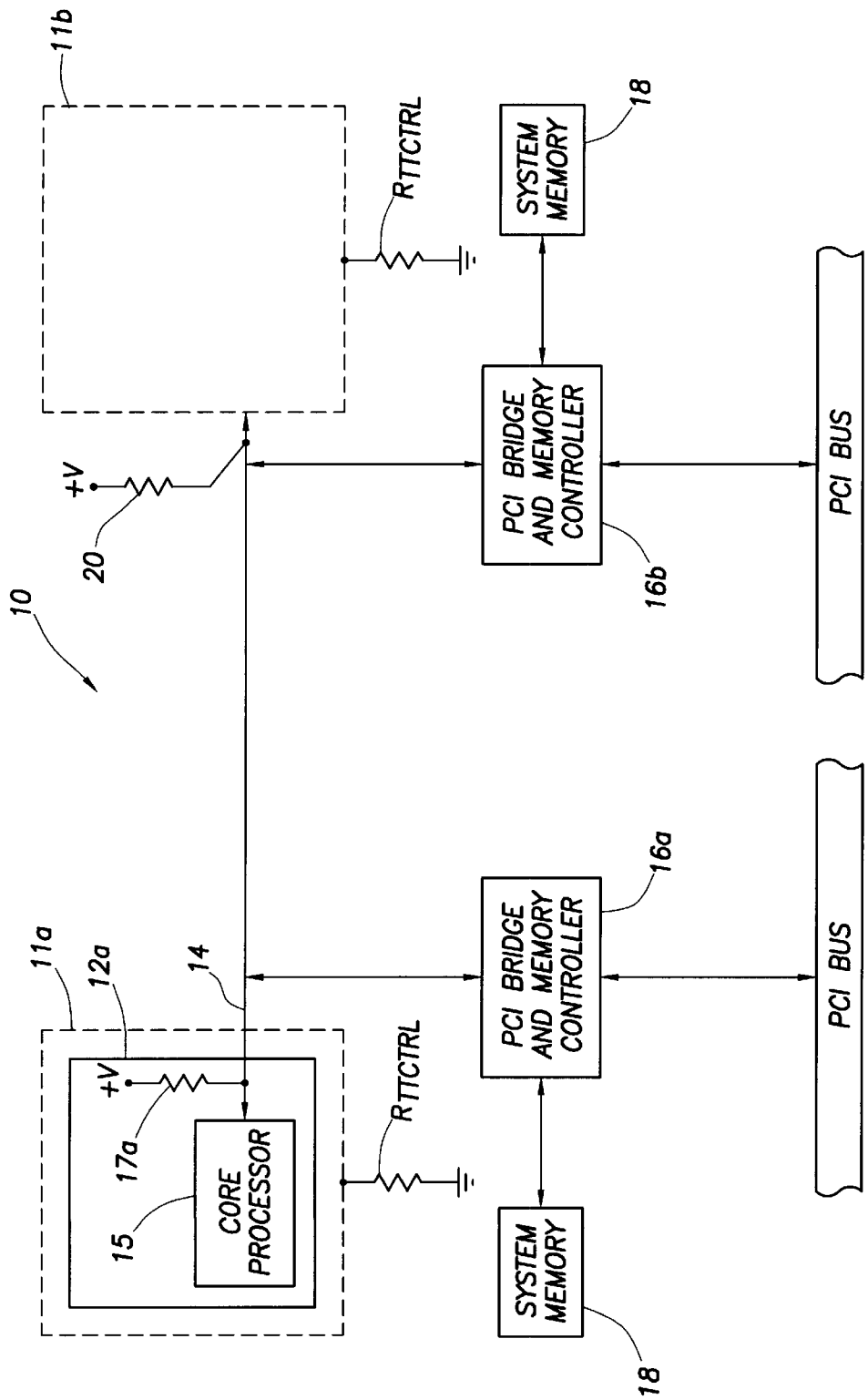
FIG. 2 is a schematic block diagram of a single processor computer system.

Shown in FIG. 2 is a schematic block diagram of a computer system 10 that is the same as the computer system 10 of FIG. 1 except that the computer system does not include a processor coupled to socket 11b. Despite the absence of a processor in socket 11b, the endpoint of processor bus 14 near socket 11b is terminated by termination resistor 20. As a result of termination resistor 20, processor bus 14 is terminated despite the absence at socket 11b of a processor, a termination card, or a termination device. Processor 12a is sometimes referred to herein as the first processor or the primary processor, and processor 12b is sometimes referred to herein as the second processor or the optional processor. The placement of a termination resistor at the endpoint of processor bus 14 at socket 11b allows for the termination of processor bus 14 irrespective of whether a processor package is installed in socket 11b. If a processor package is installed in socket 11b, then the termination resistance at the endpoint of processor bus 14 is the parallel coupling of termination resistor 17 and termination resistor 20. If a processor package is not installed in socket 11b, then the termination resistance at the endpoint of processor bus 14 is termination resistor 20.

The value of termination resistor 20 can be set so that the effective resistance at the endpoint of processor bus 14 is within an acceptable operating limit regardless of whether a processor package is installed in socket 11b. The values of termination resistors 17a and 17b are not fixed, but instead can be set by manipulating the pins of processors 12a and 12b. As an example, termination resistor 17a of processor 12a may be set to a value of 62 ohms. To accommodate this resistance value of termination resistor 17a, and to set the impedance at the opposite endpoint of the processor bus to achieve an impedance matching condition on processor bus 14, the value of termination resistor 20 can be set to 75 ohms. In the dual processor case, when the value of termination resistor 17b is selected as 130 ohms, the parallel combination of a termination resistor 17b at 130 ohms and a termination resistor 20 of 75 ohms is a combined parallel resistance of 47 ohms. Thus, in the dual processor case, the termination resistor value at the endpoint of processor bus 14 nearest processor 12*a* is 62 ohms and the termination resistor value at the endpoint of processor bus 14 nearest processor 12*b* is nominally 47 ohms, and the effective resistance at each endpoint of the processor bus (62 ohms and 47 ohms) is within the range of acceptable values to provide an impedance matching condition at the endpoints of processor bus 14. In the single processor case, the effective value of the resistance at the endpoint of the processor bus 14 at socket 11*b* is nominally 75 ohms, which is the resistance value of termination resistor 20. In the single processor case, the effective resistance at each endpoint of the processor bus (62 ohms and 75 ohms) is within the range of acceptable values to provide an impedance matching condition at the endpoints of processor bus 14.

A benefit of the processor bus termination technique disclosed herein is the use of a external termination resistor that has a predictable tolerance range. An external termination resistor will typically have a closer tolerance range for its resistance value as compared with an onboard termination resistor or the processor bus itself The tolerance range of an onboard termination resistor, such as termination resistors 17*a* and 17*b*, may be ±fifteen percent, and the tolerance range of the processor bus itself may be ±ten percent. Shown in the table is a comparison of the tolerance ranges and the resulting resistance ranges for the endpoints of the bus and the bus itself for both the single processor (Table 1) and dual processor (Table 2) case.

TABLE 1

Termination Resistance for Processor Bus for Single Processor Case

|  | Primary Processor Bus Endpoint | Processor Bus | Optional Processor Bus Endpoint |
|---|---|---|---|
| Nominal Resistance and Tolerance | 62 ohms ∓ 15% | 57 ohms ∓ 10% | 75 ohms ∓ 5% (external resistor) |
| Resistance Range (including Tolerance) | 52 ohms – 71 ohms | 51 ohms – 63 ohms | 71 ohms – 78 ohms |

TABLE 2

Termination Resistance for Processor Bus for Dual Processor Case

|  | Primary Processor Bus Endpoint | Processor Bus | Optional Processor Bus Endpoint |
|---|---|---|---|
| Nominal Resistance and Tolerance | 62 ohms ∓ 15% | 57 ohms ∓ 10% | 75 ohms ∓ 5% (external resistor) paralleled with 130 ohms ∓ 15% (onboard resistor) |
| Resistance Range (including Tolerance) | 52 ohms – 71 ohms | 51 ohms – 63 ohms | 43 ohms – 51 ohms |

As shown in Tables 1 and 2, the resistance ranges of processor bus 14 and the endpoints of processor bus 14 are sufficient to allow an impedance matching condition at points of processor bus 14.

The processor bus termination technique introduces only a small degree of capacitive loading effects on processor bus 14. The capacitance of the external termination resistor 20 is typically 1 pF or less. In contrast, the capacitance of an external termination device may range from 3–6 pF, and the capacitance of a termination card may be about 2 pF. The cost of an external termination resistor is substantially less than the costs of either a termination device or a termination card. The use of single termination resistor at the endpoint of the processor bus at the optional processor removes the necessity of determining at the time of manufacture whether the computer system being manufactured will be a single processor or a dual processor system. Regardless of whether the computer system under manufacture is a single processor system or a dual processor system, an inexpensive termination resistor is installed and provides for the termination of the processor bus. Thus, even in the case of a single processor system, a termination card need not be used to terminate the processor bus at the empty processor socket.

It should also be recognized that the termination method disclosed herein is not limited in its use to computer systems that can be configured for, at most, two processors. Rather, this method may be used for any multi-processor system in which at least one of the processor sockets on the printed circuit board of the computer system is unpopulated.

Although the present disclosure has been described in detail, it should be understood that various changes, substitutions, and alterations can be made hereto without departing from the spirit and the scope of the invention as defined by the appended claims.

What is claimed is:

1. A computer system, comprising:
 a processor bus coupled between processor sockets, at least one of the sockets being an optional processor socket that may or may not receive a processor depending on the configuration of the computer system; and
 an external resistor coupled between the processor bus at the optional processor socket and a higher voltage potential, wherein the external resistor is external of any processor package;
 wherein the processor bus is terminated at the endpoint nearest the optional processor socket irrespective of whether the optional processor socket is populated such that the effective resistance at the endpoints of the processor bus is within a range of acceptable values to provide an impedance matching condition at the endpoints of the processor bus irrespective of whether the optional processor socket is populated.

2. The computer system of claim 1, wherein the external resistor is coupled between the processor bus at the optional processor socket and power.

3. The computer system of claim 1, wherein the effective resistance seen at the endpoint of the processor bus at the optional processor socket in the case that the optional processor socket is not populated is the resistance of the external resistor.

4. The computer system of claim 1, wherein the effective resistance seen at the endpoint of the processor bus at the optional processor socket in the case that the optional processor is populated by a processor is the parallel resistance of the external resistor and an onboard termination resistor in the optional processor that populates the optional processor socket.

5. A method for terminating a processor bus in a computer system, wherein the processor bus is coupled between processor sockets, wherein at least one of the processor sockets is an optional processor socket that may or may not be populated by a processor depending on the configuration of the computer system, comprising the step of:
 coupling an external termination resistor between the processor bus proximate the optional processor socket and a higher voltage potential such that the processor bus is terminated at the end of the processor proximate the optional processor socket irrespective of whether a device is present in the optional processor socket such that the effective resistance at the endpoints of the processor bus is within a range of acceptable values to provide an impedance matching condition at the endpoints of the processor bus irrespective of whether the optional processor socket is populated by a device.

6. The method for terminating a processor bus of claim 5, wherein the termination resistor is coupled between the processor bus and power.

7. The method for terminating a processor bus of claim 6, wherein the coupling of the termination resistor results, in the case that is a device is not coupled to the optional processor socket, in an effective resistance at the endpoint of the processor bus that is equal to the resistance of the external resistor.

8. The method for terminating a processor bus of claim 5, wherein the coupling of the termination resistor results, in the case that a processor is coupled to the optional processor socket, in an effective resistance that is the cumulative resistance of the external resistor and a termination resistor of an optional processor that is coupled to the optional processor socket.

9. A computer system, comprising:

a processor bus;

a primary processor socket coupled to a first endpoint of the processor bus;

a secondary processor socket operable to receive an optional processor and coupled to a second endpoint of the processor bus; and an external termination resistor coupled at a point near the second endpoint of the processor bus between the processor bus and a higher voltage potential, wherein the external termination resistor terminates the processor bus irrespective of whether a device is installed in the secondary processor socket such that the effective resistance at the first and second endpoints of the processor bus is within a range of acceptable values to provide an impedance matching condition at the first and second endpoints of the processor bus irrespective of whether the optional processor socket is populated by a device.

10. The computer system of claim 9, wherein the external termination resistor is coupled between the second endpoint and power.

11. The computer system of claim 9, wherein the effective resistance at the second endpoint of the processor bus is equal to the resistance of the external termination resistor when a device is not coupled to the second processor socket.

12. The computer system of claim 9, wherein the effective resistance at the second endpoint of the processor bus is equal to the cumulative resistance of the external termination resistor and the onboard termination resistor of the optional processor when the optional processor is coupled to the second processor socket.

* * * * *